US012779901B2

(12) United States Patent
Peterson et al.

(10) Patent No.: US 12,779,901 B2
(45) Date of Patent: Nov. 3, 2026

(54) LOAD WHEEL ASSEMBLIES WITH IMPROVED STATIC DISSIPATIVE AND CONDUCTIVE PERFORMANCE

(71) Applicant: SUPERIOR TIRE & RUBBER CORP., Warren, PA (US)

(72) Inventors: Joseph J. Peterson, Warren, PA (US); Kyle Robert Knotowicz, Jamestown, NY (US)

(73) Assignee: SUPERIOR TIRE & RUBBER CORP., Warren, PA (US)

(*) Notice: Subject to any disclaimer, the term of this patent is extended or adjusted under 35 U.S.C. 154(b) by 0 days.

(21) Appl. No.: 19/307,882

(22) Filed: Aug. 22, 2025

(65) Prior Publication Data

US 2026/0054520 A1 Feb. 26, 2026

Related U.S. Application Data

(60) Provisional application No. 63/687,129, filed on Aug. 26, 2024.

(51) Int. Cl.

| | |
|---|---|
| ***B60B 11/00*** | (2006.01) |
| ***B60R 16/06*** | (2006.01) |
| ***B66F 9/075*** | (2006.01) |

(52) U.S. Cl.

CPC .............. *B60B 11/00* (2013.01); *B60R 16/06* (2013.01); *B66F 9/07586* (2013.01); *B60B 2360/341* (2013.01); *B60B 2900/10* (2013.01); *B60B 2900/921* (2013.01)

(58) Field of Classification Search

CPC .... B60R 16/06; B60C 19/08; B60B 2900/921

USPC ........................................ 361/221; 152/152.1

See application file for complete search history.

(56) References Cited

U.S. PATENT DOCUMENTS 2,524,163 A * 10/1950 Criss ........................ B60R 16/06 191/1 R 4,763,383 A * 8/1988 Estkowski .............. B60R 16/06 361/219

* cited by examiner

*Primary Examiner* — S. Joseph Morano

*Assistant Examiner* — Alex Palmer

(74) *Attorney, Agent, or Firm* — Paul D. Strain, Esq.; Strain & Strain PLLC

(57) ABSTRACT

This invention relates generally to wheel assemblies for a material handling vehicle, such as forklifts and pallet trucks, and the components therein. In one preferred embodiment, the wheel assemblies include conductive brush spacer assembly with tunable properties (conductivity/resistance, as well as mechanical properties) to adapt the brush spacer assembly. Embodiments of the present application may be used in various wheel assemblies, as discussed herein.

8 Claims, 7 Drawing Sheets

LOAD WHEEL ASSEMBLIES WITH IMPROVED STATIC DISSIPATIVE AND CONDUCTIVE PERFORMANCE

CROSS-REFERENCE TO RELATED PATENT APPLICATIONS

This application is based upon and claims the benefit of priority under 35 U.S.C. § 5 119(e) to U.S. Provisional Application No. 63/687,129, filed Aug. 26, 2024, the entire contents of all of which are incorporated herein by reference in their entirety.

FIELD OF THE INVENTION

This invention relates generally to wheel assemblies for a material handling vehicle, such as forklifts and pallet trucks, and the components therein. In one preferred embodiment, the wheel assemblies include conductive brush spacer assembly with tunable properties (conductivity/resistance, as well as mechanical properties) to adapt the brush spacer assembly. Embodiments of the present application may be used in various wheel assemblies, as discussed herein.

BACKGROUND OF THE INVENTION

Under normal operating conditions, components of material handling vehicles (such as forklifts, pallet trucks, and the like) that come into repetitive contact with surfaces can obtain a buildup of static charge. In particular, wheel assemblies, and in particular wheel components such as nonconductive tires, are prone to accumulate significant static charge—with the amount of static charge accumulating depending on many factors, including tire material, floor material, environmental conditions (e.g. humidity), wheel speed and load, and frequency of use.

Historically, warehouse requirements and normal operating conditions typically did not require any attention be paid to static accumulation or consideration of efforts to remediate static—such as implementing special precautions preventing accumulation of static charge or allowing static charge to discharge in a controlled manner. In uncommon, special-use cases, static became an important consideration, for example where material handling vehicles operated in hazardous environments (e.g., in the presence of or near flammable liquids or materials), where such vehicles handled hazardous materials (e.g., solvents, fuels, or explosives), or where such vehicles handled sensitive equipment such as spacecraft, satellites, or other electronics where static build-up and sudden discharge could damage the equipment.

Under these special circumstances, the conventional wisdom has been to utilize special materials and designs, for example using tires made from conductive elastomer compounds and/or adding additional grounding components such as a grounding strap. These approaches, however, have several drawbacks.

For example, using special additives or fillers in tire elastomer compounds to impart some level of conductivity has a negative impact on other desirable materials properties, like tensile strength and modulus, and impairs dynamics and the ability of the modified elastomer to carry a load without generating excessive heat. Embedding conductive materials into polyurethane tires (e.g. by molding tires with radial conductive plugs) causes manufacturing problems where the conductive plugs can trap air during molding or cause a defect point in the elastomer where cracking, tearing, and delamination could start due to the inhomogeneous nature of the tire tread material.

Grounding straps, while simple and widely used in various applications, are single point contacts and can become caught in debris, moving components, ground features and surface defects in the floor, or racking in a warehouse environment. Additionally, these straps must typically be placed away from the parts of the vehicle that handle materials to avoid the strap interfering or being caught in pallets or other loads as goods are moved. Such placement substantially reduces control over static build up, however, in regions where it may be most needed—near the sensitive materials the vehicle is handing.

Thus, the current approaches have significant drawbacks, by reducing wheel performance and lifetime, and adding significant costs in materials, manufacturing, and maintenance over time, and often failing to control static where such control is most needed. These approaches also increase equipment downtime, which is a significant consideration in modern warehousing.

In recent years, trends in the global economy have combined to create a need in the market for solutions that provide more economical and practical static conductive or dissipative performance to material handling vehicles even in standard applications which did not previously require it. As the global economy has shifted to e-commerce and mega-sized distribution centers, material handling vehicles are being designed to move faster and carry heavier loads over longer distances, generating more static build-up. At the same time, the electronics in these vehicles have gotten more and more sophisticated, with an increased number of chips and computers that can be potentially affected by this static build-up, especially in the growing trend of driverless and robotic/autonomously operated material handling vehicles. A better wheel assembly is needed to solve this growing problem.

SUMMARY OF THE INVENTION

The inventors of the present application have designed new wheel assemblies that provide static dissipation or static conduction without the drawbacks associated with current techniques.

In one aspect, the present application provides a wheel assembly comprising an axle on which is mounted one or more wheels and one or more conductive brush spacers, also referred to in this application as out-disk brushes, adjacent to or between wheels. In the configurations shown herein, the out-disk brushes dissipate or conduct static charge present on the wheel assembly, and in particular the tire, which accumulates during normal operation of a material handling vehicle.

In another aspect, the present application provides an out-disk brush capable of being mounted on an axle adjacent to and/or between one or more wheels. In one embodiment, the out-disk brush includes a central hub having a bore that accommodates the axle. The central hub can be embodied as a ring-shaped structure or a discontinuous ring, and can be made of conductive or non-conductive material. Attached to the central hub are a plurality of fibers extending radially outwardly from the central hub. These fibers may be affixed in a channel in the central hub, which channel is on the radially outward face of the hub.

In embodiments of the present application, the fibers form a radial brush and are configured to come into contact with the wheels, including the tires mounted thereon. Because the brush includes a plurality of fibers, a plurality of contact points exist between the wheel/tire and the brush. Preferably, the fibers comprise a conductive material having a resistance permitting dissipation or conduction of static charge away from the wheels and tires, with such resistance being adjustable by varying the fiber material. In some embodiments, the fibers are also configured to contact the ground, permitting static charge to flow from the wheels, through the out-disk brushes, directly to ground. As with the wheels, because the brush includes a plurality of fibers, a plurality of contact points exist between the ground and the brush. In this manner, the out-disk brushes provide a short ground path for dissipation or conduction of static charge to ground.

In some embodiments, the fibers may be configured so they do not directly contact the ground, but instead are electrically connected to other components of the material handling vehicle that are in contact with ground. For example, the fibers may be mounted on a conductive hub, which when mounted on a metal axle secured in the wheel assembly by metal hardware, can provide a conductive path between the wheels and a metal portion of the vehicle on which a ground strap is mounted (e.g. the frame).

The out-disk brush and wheel assembly described herein have several advantages. The out-disk brush configuration provides improved static control by creating pathways between ground and non-conducting tire elastomer, where static charge can accumulate during vehicle operation. This short path allows such charge to be efficiently discharged back to earth via a path that is as far away as possible from hazardous or sensitive materials handled by the vehicle and from the vehicle's own electronics.

The out-disk brush configuration also does not require special materials be used in the wheel or tire in a wheel assembly, but instead permits other engineering considerations to drive materials selection and wheel assembly design, for example considerations that would permit wheel assemblies to support greater loads and extended lifetimes.

The out-disk brush configuration can also be accommodated by traditional wheel assembly designs, which typically include a spacer or washer to provide proper alignment within the wheel housing and on the axle. This provides proper load bearing pathways with the bearings and prevents binding and mis-alignments. Spacers are small metal washers and shims that slide over the axle but do not typically make contact with the tires. The out-disk brushes of the present application can replace traditional spacers and washers and provide not only the function of the spacer, but also static control directly at the point in the vehicle where static is being generated.

The subject matter of the present application can also be used across diverse wheel assembly designs. By way of non-limiting example, the out-disk brushes can be located between two or more wheels, such as in a dual- or triple-wheel assembly that is commonly used in the rear links of class III pallet trucks. They can also be used on the outside of single wheel assemblies, taking the place of spacers commonly arranged between the wheels and the side plates or housings in rear links (e.g., as used in class III pallet truck forks) and outriggers or outrigger assemblies such as rockers (e.g., as used in class II reach truck outriggers). Or they can be used in caster assemblies e.g., as used in class II and class III truck undercarriages). The brush can be on one side of the wheel or both sides for redundancy and improved lifetime.

In another aspect, the present application provides a material handling vehicle comprising a wheel assembly or an out-disk brush described herein. These wheel assemblies and out disk brushes are useful on a diverse range of material handling vehicles, including class I, class II, class III, class IV, class V, class VI, and class VII material handling vehicles (Occupational Safety and Health Administration (OSHA), Powered Industrial Trucks (Forklift) eTool, Forklift Classifications, https://www.osha.gov/etools/powered-industrial-trucks/types-fundamentals/types/classes). The vehicles of the present application can incorporate the wheel assemblies and out-disk brushes discussed herein.

In another aspect, the present application provides a method for dissipating or conducting static charge accumulating on the wheel or tire of a material handling vehicle. In one embodiment, the method includes providing a vehicle, wheel assembly, or out-disk brush described in the present application, operating the vehicle, wheel assembly, or out-disk brush such that a static charge building up on a component of the vehicle or wheel assembly, especially the wheel and the tire mounted thereon, is dissipated or conducted to ground via the out-disk brush or a dissipative or conductive path that includes the out-disk brush.

In another aspect, the present application provides a method for making an out-disk brush, a wheel assembly comprising an out-disk brush, or a material handling vehicle comprising an out-disk brush or a wheel assembly having an out-disk brush.

Further objects, features, and advantages of the present application will become apparent from the detailed description of preferred embodiments which is set forth below, when considered together with the figures of drawing.

DETAILED DESCRIPTION OF CERTAIN EMBODIMENTS

Definitions

Figure 1:
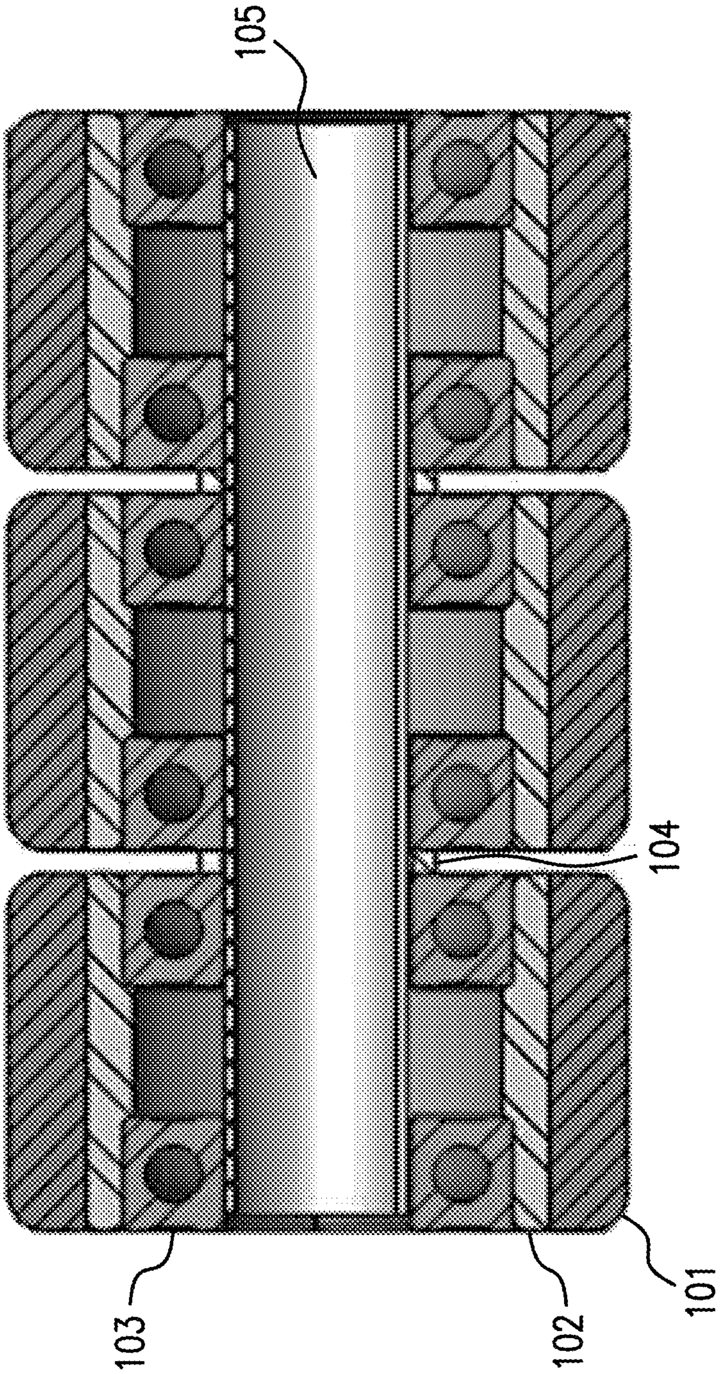
FIG. 1 Prior Art
FIG. 1 depicts a section view of a wheel assembly including wheels (having tires 101, hubs 102, and bearings 103), spacers 104 arranged between the wheels, and bearings arranged between the wheel hub 102 and the axle 105 to reduce friction and facilitate smooth rotation.
Figure 2:
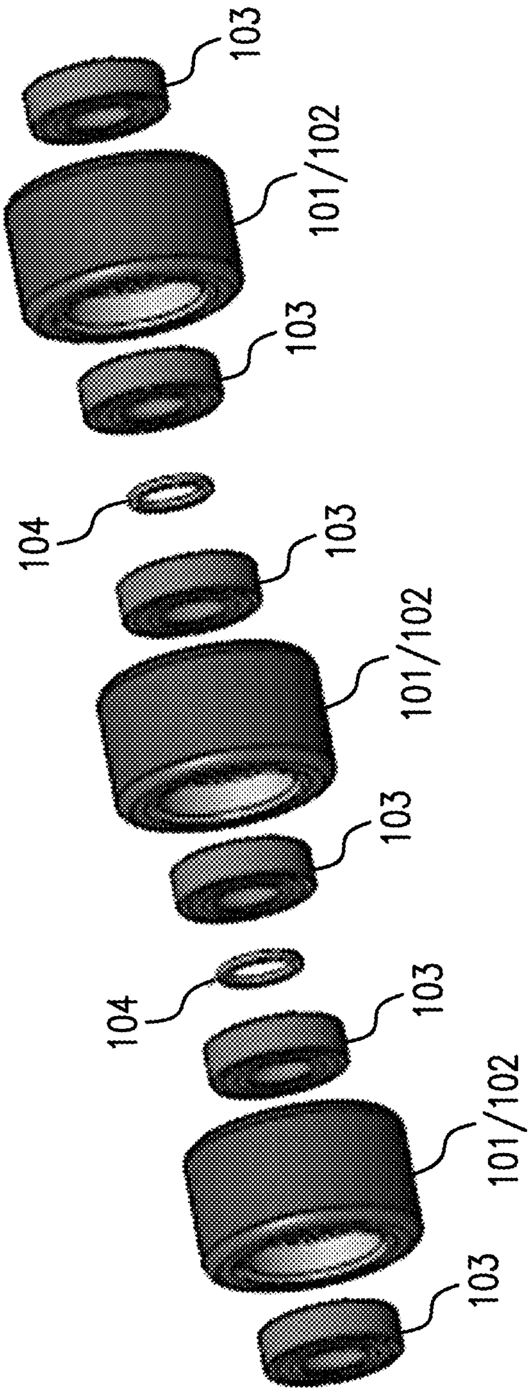
FIG. 2 Prior Art
FIG. 2 depicts an exploded view of a wheel assembly as shown in FIG. 1 (omitting the axle).

The present invention may be understood more readily by reference to the following detailed description of the preferred embodiments of the invention and the Examples included herein. Unless defined otherwise, all technical and scientific terms used herein have the same meaning as commonly understood by one of ordinary skill in the art to which the invention pertains.

The terms "about" or "approximate" and the like are synonymous and are used to indicate that the value modified by the term has an understood range associated with it, where the range can be ±20%, ±15%, ±10%, ±5%, or ±1%. The term "substantially" is used to indicate that a value is close to a targeted value, where close can mean, for example, the value is within 80% of the targeted value, within 85% of the targeted value, within 90% of the targeted value, within 95% of the targeted value, or within 99% of the targeted value.

As used herein, the singular forms "a", "an", and "the" include plural references unless indicated otherwise. It is noted that in this disclosure, terms such as "comprises," "comprised," "comprising," "contains," "containing" and the like can have the meaning attributed to them in U.S. patent law; e.g., they can mean "includes," "included," "including" and the like. Terms such as "consisting essentially of" and "consists essentially of" have the meaning attributed to them in U.S. patent law, e.g., they allow for the inclusion of additional features or steps that do not detract from the novel or basic characteristics of the invention, i.e., they exclude additional unrecited features or steps that detract from the novel or basic characteristics of the invention. The terms "consists of" and "consisting of" have the meaning ascribed to them in U.S. patent law; namely, that these terms are closed ended. Accordingly, these terms refer to the inclusion of a particular features or step and the exclusion of all other features or steps.

As used herein, "static dissipation" refers to a controlled and gradual neutralization of an electrostatic charge accumulated on the surface of a material by allowing the charge to slowly transfer to a grounding point or another conductive surface, thereby mitigating the risk of a rapid and potentially damaging electrostatic discharge.

As used herein, "static conduction" refers to the process by which an electrostatic charge is directly transferred from one object to another upon physical contact, resulting in the movement of electrons and the equalization of the electrostatic potential between the two objects.

As used herein, the "nominal diameter" of an object refers to the named or standardized diameter of the object. This measurement is not necessarily the exact physical diameter of the object but is used for identification, specification, and standardization purposes.

As used herein, the unit "Ω" refers to ohms.

Out-Disk Brush

In one aspect, the present application provides an out-disk brush. In a preferred embodiment, the out-disk brush is mounted on an axle adjacent to and/or between one or more wheels in a wheel assembly.

In one embodiment, the out-disk brusk includes a central hub having a bore that accommodates an axle. The central hub can be embodied as a ring-shaped structure or a discontinuous ring, which either fully or partially circumferentially surrounds an axle which is disposed in the bore of the central hub. In a preferred embodiment, attached to the central hub are a plurality of fibers extending radially outwardly from the central hub, which fibers form a brush. In a preferred embodiment, the central hub includes a channel on the radially outward face of the hub, i.e., the face radially opposite the surface of the bore accommodating the axle. In this configuration, the fibers may be affixed within the channel in the central hub.

Figure 3:
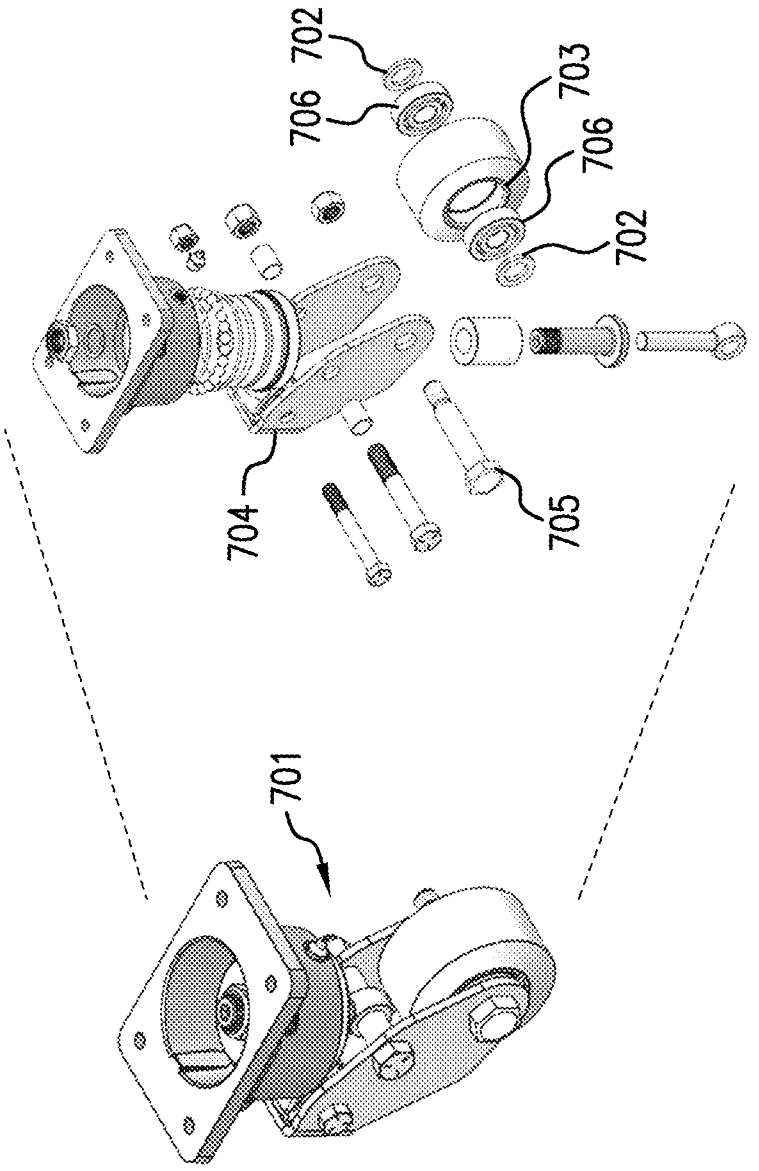
FIG. 3 Prior Art
FIG. 3 depicts an exploded section view of an embodiment of a wheel assembly according to the present application, including wheels (having tires, hubs, and bearings), an axle, and out-disk brushes arranged between the wheels.

FIG. 3 depicts an exploded section view of an embodiment of a wheel assembly according to the present application, including wheels (310). Each wheel (310) includes a tire (311), hub (312), and bearings (313). The wheel assembly further includes an axle (320) and out-disk brushes (330) arranged between the wheels (310). The out-disk brushes (330) comprise a central hub (331) having a bore (332) and a plurality of fibers (333) that extend from the hub (331) and form a brush. While not depicted in FIG. 3, in one embodiment the central hub includes a channel on its radially outward face in which the fibers are affixed.

The axle (320), tire (311), hub (312), and bearing (313) are made of standard materials and constructions. In one embodiment, the central hub (311) of the out-disk brushes comprises a metal or metal alloy, a conductive polymer, a ceramic, or a composite material. Preferably, the central hub comprises a metal, for example aluminum, steel, brass, bronze, or other alloys. The central hub can be a continuous ring or a discontinuous ring that is formed from a linear structure by bending, curling, or rolling. In one embodiment, the fibers (333) of the out-disk brush comprise a material capable of dissipating or conducting static charge.

In one embodiment, the fibers (333) are designed to dissipate static charge, and are thus static dissipative fibers. In one embodiment, the static dissipative fibers (333) comprise a material having a resistivity between $10^5$ and $10^{10}$ Ω·m. In a preferred embodiment, the static dissipative fibers (333) comprise a material having a resistivity between $10^5$ and $10^8$ Ω·m. In another embodiment, the static dissipative fibers (333) have a resistivity between $10^8$ and $10^{10}$ Ω·m. In one embodiment, the static dissipative fibers (333) comprise a conductive fiber, e.g. conductive nylon. By way of non-limiting example, the conductive nylon can comprise nylon having conductive fillers, such as carbon fibers, or fibers having a conductive coating. Conductive nylon may be obtained commercially, e.g. MC501CD.

In another embodiment, the fibers (333) are designed to conduct static charge, and are thus static conductive fibers. In one embodiment, the static conductive fibers (333) comprise a material having a resistivity lower than $10^5$ Ω·m. In one embodiment, the static conductive fibers (333) comprise a metal such as brass, or a conductive polymer such as an electrically and thermally conductive nylon 6,6 (e.g., doi: 10.1002/pc.10387).

In a preferred embodiment, the fibers (333) are designed to contact the wheels (310) adjacent to the out-disk brush (330) having the fibers (333), preferably the tire (311) of each wheel (310). Preferably, the fibers create a plurality of contact points with the wheel (310)/tire (311). In a preferred embodiment, the fibers (333) are also designed to contact the ground, permitting static charge to flow from the wheels, through the out-disk brushes, directly to ground. In this manner, the out-disk brushes provide a short ground path for dissipation or conduction of static charge to ground.

The fibers (333) can be glued, crimped, or threaded through the central hub (311). The fibers (333) can be packed in different densities and can be essentially fully packed radially from the central structure or can be chosen to be in groups. When provided in groups, the fibers (333) can provide intermittent contact as the wheel (310) rolls. The individual fibers (333) can be straight or textured, such as crimping, to provide more volume of fibers axially or less volume of fibers axially to fill the space between the wheels (310) or in assemblies as needed.

In some embodiments, the fibers (333) may be configured so they do not directly contact the ground, but instead are electrically connected to other components of the material handling vehicle that are in contact with ground. For example, the fibers (333) may be mounted on a conductive hub, which when mounted on a metal axle secured in the wheel assembly by metal hardware, can provide a conductive path between the wheels and a metal portion of the vehicle on which a ground strap is mounted (e.g. the frame).

In some embodiments, the diameter of the brush relative to the tire diameter is adjusted to control the amount of ground contacting fibers in the brush. In a preferred embodiment, the brush has an outer diameter of no less than approximately 5% smaller than the nominal outside diameter of the tire to allow for the fibers to make ground contact as the tires are deflected under load when mounted to a vehicle. In a preferred embodiment, the brush has an outer diameter of no greater than 20% larger than the nominal diameter of the tire to prevent excess fibers from experiencing negative effects from flex fatigue, getting caught in floor defects (such as cracks), and picking up excess debris, among other things. In a particularly preferred embodiment, the brush has an outer diameter between 5% less and 5% more than the nominal diameter of the tire or tires in the assembly. In a most preferable embodiment, the brush has an outer diameter between 3% less and 1% more than the nominal diameter of the tire or tires in the assembly.

Figure 4:
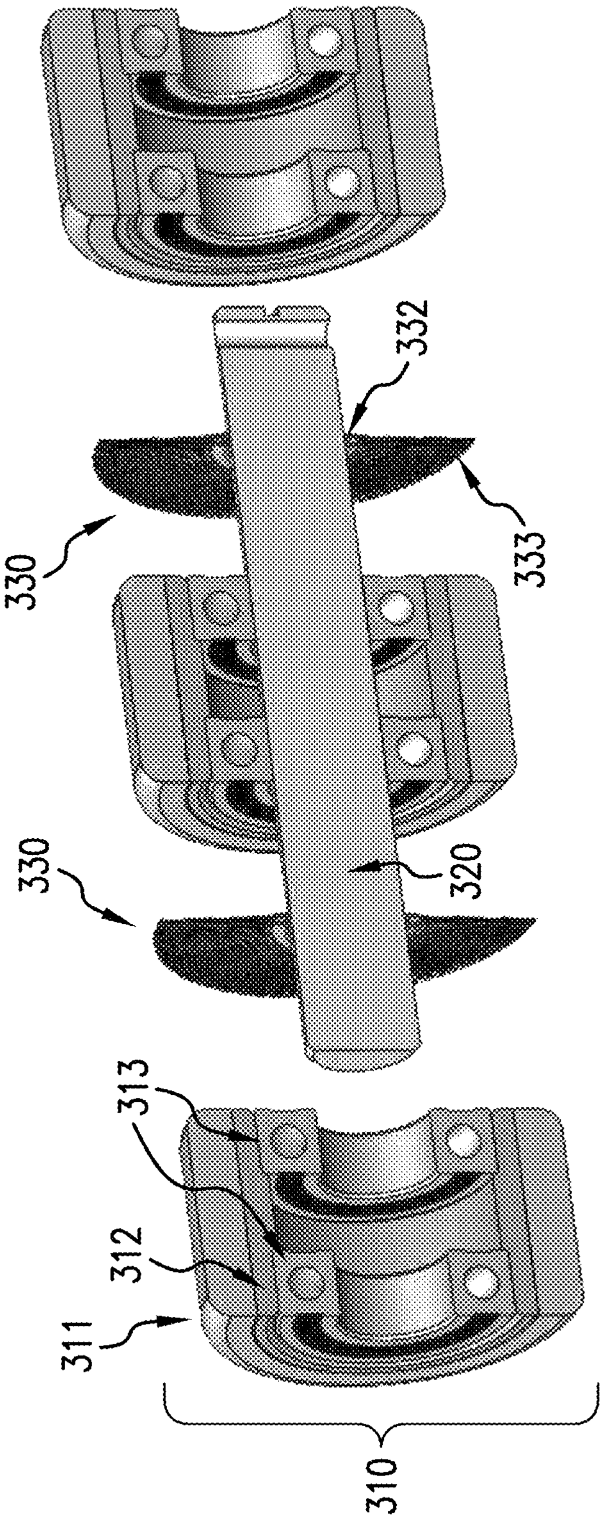
FIG. 4 depicts a section view (non-exploded) of the embodiment shown in FIG. 3.

FIG. 4 depicts a section view (non-exploded) of the embodiment shown in FIG. 3, including wheels (310), tires (311), hubs (312), bearing (313), axle (320), and out-disk brushes (330) arranged between the wheels (310).

Wheel Assemblies

In another aspect, the present application provides wheel assemblies comprising an axle on which is mounted one or more wheels and one or more out-disk brushes adjacent to or between wheels. In the configurations shown herein, the out-disk brushes dissipate or conduct static charge present on the wheel assembly, and in particular the tire, which accumulates during normal operation of a material handling vehicle. One embodiment of such a wheel assembly is depicted in FIGS. 3-4 and described above.

Figure 5:
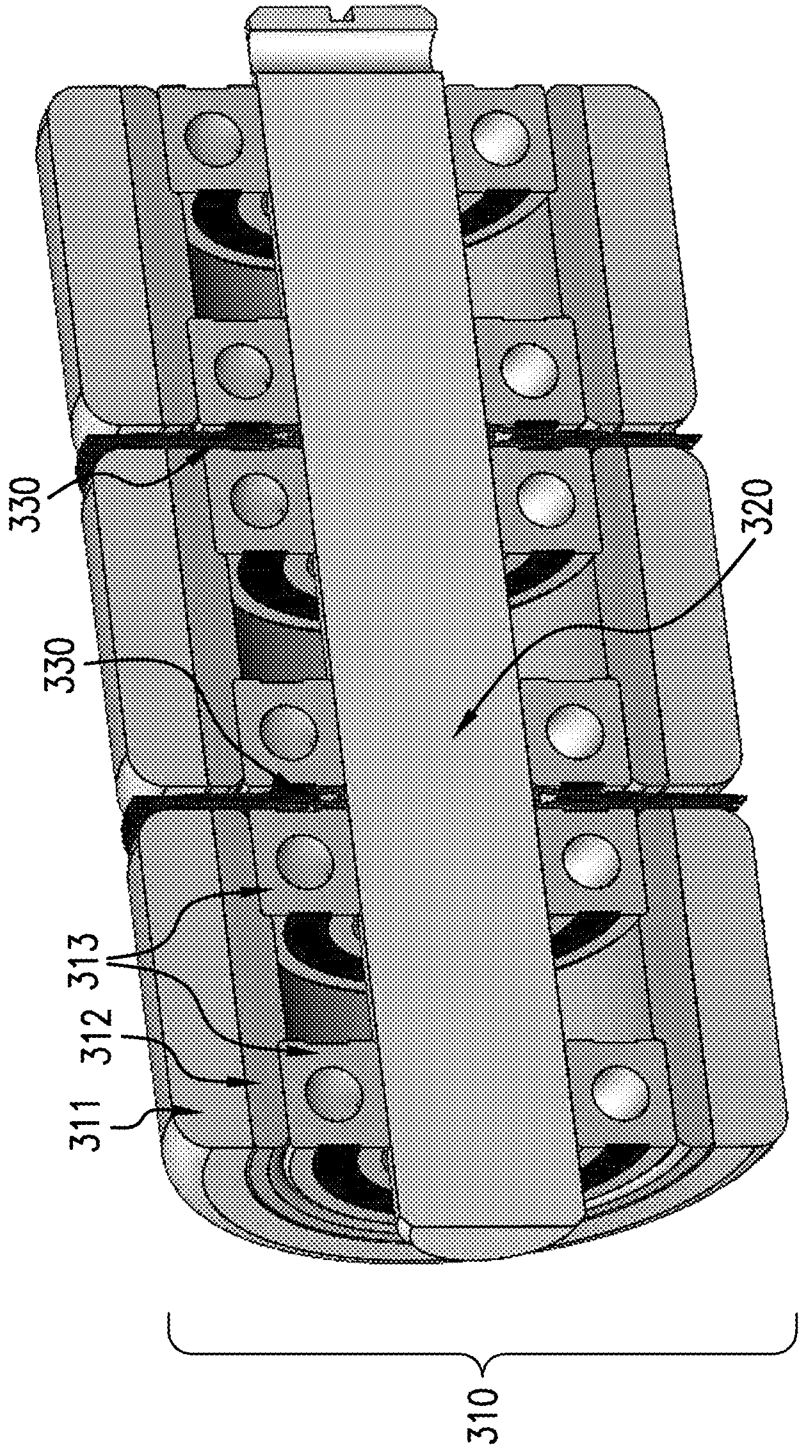
FIG. 5 depicts a class III pallet truck rear link assembly with a single load wheel, showing spacers between the wheel and rear link, which spacers can be replaced by the out-disk brushes according to the present application.

FIG. 5 depicts a class III pallet truck rear link assembly (501) with a single load wheel (502), having spacers (503) between the wheel (502) and rear link (504), which spacers (503) are replaced by the out-disk brushes according to the present application. In such configuration, the out-disk brushes, and in particular the plurality of fibers of the out-disk brushes, are capable of contacting the wheel (502), including the tire thereof. In some embodiments, the out-disk brushes can be provided only on one side of the wheel (502), or on both sides for redundancy and improved lifetime. In cases where the out-disk brushes are provided only on one side, a spacer may be provided on the other.

In one embodiment, the out-disk brushes can be covered on the non-wheel side with a washer so as to provide support for the fibers, hold them against the wheel (502), and create more contact points between the fibers and the wheel (502). The out-disk brushes are also optionally capable of contacting the rear link (504) and/or the ground depending on length and configuration of the fibers. If the fibers contact the ground, a static dissipative or conductive path may be provided between the wheel and the ground. If the fibers contact the rear link (504), a static dissipative or conductive path may be provided between the wheel and the rear link (504), which itself may be grounded or electrically connected with a component that is grounded.

Figure 6:
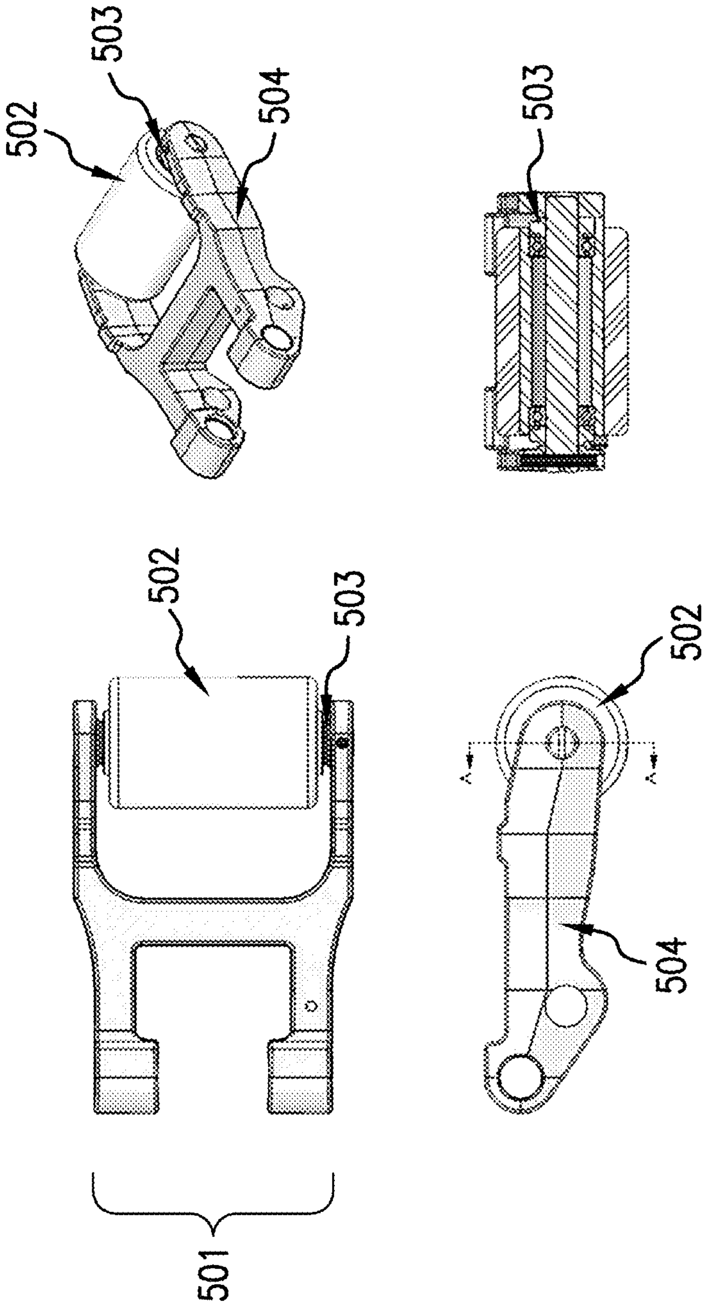
FIG.6 Prior Art
FIG. 6 depicts a dual wheel rocker assembly from a class II reach truck outrigger arm showing spacers between the wheel and the side plate, which spacers can be replaced by the out-disk brushes according to the present application.

FIG. 6 depicts a dual wheel rocker assembly (601) from a class II reach truck outrigger arm showing spacers (602) between the wheel (603) and the side plate (604), which spacers (602) can be replaced by the out-disk brushes according to the present application. Axles (605), end caps (606), and set or grub screws (607) are also shown. In such configuration, the out-disk brushes, and in particular the plurality of fibers of the out-disk brushes, are capable of contacting the wheel (603), including the tire thereof. In some embodiments, the out-disk brushes can be provided only on one side of the wheel (603), or on both sides for redundancy and improved lifetime. In cases where the out-disk brushes are provided only on one side, a spacer may be provided on the other.

In one embodiment, the out-disk brushes can be covered on the non-wheel side with a washer so as to provide support for the fibers, hold them against the wheel (603), and create more contact points between the fibers and the wheel (603). The out-disk brushes are optionally capable of contacting the side plate (604) and/or the ground depending on length and configuration of the fibers. If the fibers contact the ground, a static dissipative or conductive path may be provided between the wheel and the ground. If the fibers contact the side plate (604), a static dissipative or conductive path may be provided between the wheel and the side plate (604), which itself may be grounded or electrically connected with a component that is grounded.

Figure 7:
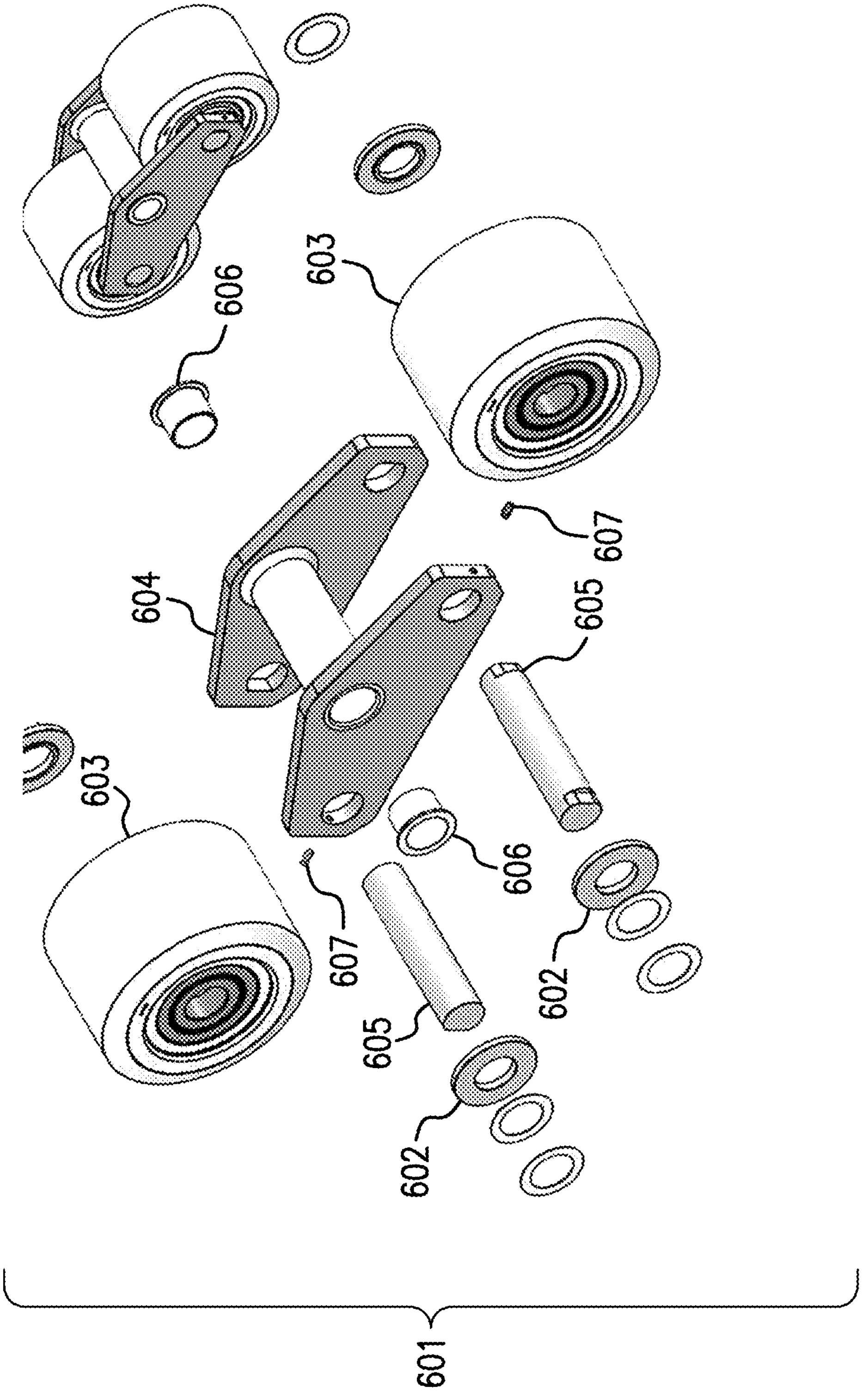
FIG. 7 Prior Art
FIG. 7 depicts a stabilizer caster from a class III pallet truck showing spacers arranged between the wheel and side plate, which spacers can be replaced by the out-disk brush according to the present application.

FIG. 7 depicts a stabilizer caster (701) from a class III pallet truck showing spacers (702) arranged between the wheel (703) and side plate (704), which spacers (702) can be replaced by the out-disk brush according to the present application. An axle bolt (705), wheel bearings (706), and other hardware are also shown. In such configuration, the out-disk brushes, and in particular the plurality of fibers of the out-disk brushes, are capable of contacting the wheel (703), including the tire thereof. In some embodiments, the out-disk brushes can be provided only on one side of the wheel (703), or on both sides for redundancy and improved lifetime. In cases where the out-disk brushes are provided only on one side, a spacer may be provided on the other.

In one embodiment, the out-disk brushes can be covered on the non-wheel side with a washer so as to provide support for the fibers, hold them against the wheel (703), and create more contact points between the fibers and the wheel (502). The out-disk brushes are optionally capable of contacting the side plate (703) and/or the ground depending on length and configuration of the fibers. If the fibers contact the ground, a static dissipative or conductive path may be provided between the wheel and the ground. If the fibers contact the side plate (704), a static dissipative or conductive path may be provided between the wheel and the side plate (704), which itself may be grounded or electrically connected with a component that is grounded.

One of ordinary skill in the art will understand that the wheel assemblies shown in this section are meant to aid in understanding the functioning of certain embodiments described herein and illustrate the breadth of applicability of the out-disk brushes set forth in this application. The wheel assemblies herein should not be read to restrict the application to certain designs or otherwise limit the claims appended to this specification.

Material Handling Vehicles

In another aspect, the present application provides a material handling vehicle comprising a wheel assembly or an out-disk brush described herein. These wheel assemblies and out disk brushes are useful on a diverse range of material handling vehicles, including class I, class II, class III, class IV, class V, class VI, and class VII material handling vehicles (Occupational Safety and Health Administration (OSHA), Powered Industrial Trucks (Forklift) eTool, Forklift Classifications, https://www.osha.gov/etools/powered-industrial-trucks/types-fundamentals/types/classes). The vehicles of the present application can incorporate the wheel assemblies and out-disk brushes discussed herein.

Method of Making and Using

In another aspect, the present application provides a method for making an out-disk brush, a wheel assembly comprising an out-disk brush, or a material handling vehicle comprising an out-disk brush or a wheel assembly having an out-disk brush.

In one embodiment, the central hub of the out-disk brushes comprises a metal or metal alloy, a conductive polymer, or an electrically conductive composite material. Preferably, the central hub comprises a metal, for example aluminum, steel, brass, bronze, or other alloys. The central hub can be a continuous ring or a discontinuous ring that is formed from a linear structure by bending, curling, or rolling. The fibers can be glued, crimped, or threaded through the central hub. The fibers can be packed in different densities and can be essentially fully packed radially from the central structure or can be chosen to be in groups, which would provide intermittent contact as the wheel rolls. The individual fibers can be straight or textured, such as crimping, to provide more volume of fibers axially or less volume of fibers axially to fill the space between the wheels or in assemblies as needed.

In another aspect, the present application provides a method for making a wheel assembly comprising an out-disk brush. In one embodiment, the method of the present application includes providing a wheel, an axle, and an out-disk brush according to the present application, and rotatably mounting the wheel on the axle adjacent to the out-disk brush.

In another aspect, the present application provides a method for making a material handling vehicle with improved static protection comprising an out-disk brush. In one embodiment, the method includes providing a material handling vehicle without a wheel assembly and a wheel assembly according to the present application. The method further includes mounting the wheel assembly according to the present application on the material handling vehicle.

In another aspect, the present application provides a method for dissipating or conducting static charge accumulating on the wheel or tire of a material handling vehicle. In one embodiment, the method includes providing a vehicle, wheel assembly, or out-disk brush described in the present application, operating the vehicle, wheel assembly, or out-disk brush such that a static charge building up on a component of the vehicle or wheel assembly, especially the wheel and the tire mounted thereon, is dissipated or conducted to ground via the out-disk brush or a dissipative or conductive path that includes the out-disk brush.

When used according to the present methods, embodiments of the present application provide improved static control by creating static charge discharge pathways between non-conducting tire elastomer material and ground. One distinct advantage of the present application is providing a plurality discharge pathways close in proximity to where the static charge is generated, as each fiber of the brush can provide a conductive path to ground.

Example

To demonstrate the effectiveness of the subject matter discussed herein, a triple-wheel assembly from the rear link of a class III pallet truck was assembled with (a) traditional washer spacers between the wheels and (b) out-disk brushes according to the present application in place of the spacers. The out-disk brushes were either conductive nylon (coated nylon) in a metal channel or brass in a metal channel, which the channel width was controlled to be the same as the traditional spacer so as not to disrupt the spacing and performance of the assembly. The assemblies with each type were placed on a steel plate to simulate a ground surface and then contacted with a meter to measure the resistance between the axles, where the assembly would mount into the truck attachment point, and the steel plate. This provides a measure of the conduction for dissipating static charge away from the vehicle. Measures read in the $10^6$ Ω range for the conductive nylon brushes, and between 0 and 10Ω for the brash brushes, and no reading was able to be detected with the standard assembly, indicating that there was no significant amount of conductivity between the axle and the steel plate. The results demonstrate static charge is able to build up more on the traditional assembly but is capable of being dissipated or conducted by the assemblies according to the present application.

The invention claimed is:

1. A wheel assembly comprising: a wheel having a nonconductive tire mounted rotatably on an axle; a conductive brush spacer disposed adjacent to the wheel, the conductive brush spacer having a hub and a plurality of fibers fixed to the hub, the plurality of fibers forming a radial brush, and wherein the plurality of fibers are arranged to provide a plurality of contact points with the tire.

2. The wheel assembly of claim 1, wherein the plurality of fibers comprise a material selected from the group consisting of conductively coated fibers, carbon fibers, and combinations thereof.

3. The wheel assembly of claim 1, wherein the hub comprises a metal or metal alloy, a conductive polymer, or an electrically conductive composite material.

4. The wheel assembly of claim 1, wherein the plurality of fibers are glued, crimped, or threaded through the hub.

5. The wheel assembly of claim 1, wherein the fibers are textured to provide more volume of fibers axially.

6. The wheel assembly of claim 1, wherein the radial brush has an outer diameter between 95% and 120% of the nominal outside diameter of the tire.

7. The wheel assembly of claim 1, wherein the radial brush has an outer diameter between 97% and 101% of the nominal outside diameter of the tire.

8. The wheel assembly of claim 1, wherein the plurality of fibers provide an electrical path between the axle and ground sufficient to permit dissipation of static charge.

* * * * *